United States Patent Office 2,879,278
Patented Mar. 24, 1959

2,879,278

PRODUCTION OF TRIALKOXY TETRAHYDROFURANS

Niels Konrad Friedrich Wilhelm Clauson-Kaas, Haifa, Israel, assignor to A/S Sadolin & Holmblad, Copenhagen, Denmark No Drawing. Application January 17, 1956
Serial No. 559,540

Claims priority, application Denmark June 26, 1951

6 Claims. (Cl. 260—347.8)

This application is a continuation-in-part of my parent applications Serial No. 295,125, filed June 23, 1952 and Serial No. 403,461, filed January 11, 1954, both now abandoned.

This present invention relates to 6-lower alkoxy tropinones, to the tri(lower alkoxy)tetrahydrofuran (and alcoholysates thereof) intermediates therefor, and to methods of producing these compounds.

It is an object of this invention to provide 6-lower alkoxy tropinones, new compounds which are useful in the tropa alkaloid field as intermediates in the preparation of the known alkaloids (e.g. 6-hydroxytropinone and valeroidine).

Another object of this invention is the provision of a group of hitherto unknown compounds which are tri(lower alkoxy)tetrahydrofurans and their alcoholysates, such compounds being liquid, colorless products which are useful as solvents for high temperature reactions such as Grignard reactions, and as intermediates in the production of (lower alkoxy)-succinic dialdehydes, from which the 6-lower alkoxy tropinones can be produced by known methods.

Another object of this invention is the provision of a method for the production of the said compounds.

These and other objects will appear from the following detailed description of the invention, which description, however, is not to be considered limitative of the scope of the invention, since obvious modifications and chemical equivalents will be apparent to those skilled in the art.

According to one aspect of this invention, it has been found that on reacting 2,5-di(lower alkoxy)-2,5-dihydrofurans with an alcohol in the presence of a strong acid, the alcohol is added to the double bond of the dihydrofuran. The action of the acid in the presence of an alcohol may further result in an alcoholysis, whereby the furan ring is opened.

Thus, the reaction mixture will generally contain a mixture of components. In order to isolate these components or some of them, the reaction mixture is fractionally distilled. Since, however, the different compounds of the mixture often have close boiling points, it may be expedient to add an alkoxide before the distillation in order to destroy components with free or hydrated aldehyde groups, or with semi-acetal groups.

It has been found that when the acid is boron trifluoride, particularly good yields of the desired acetals are obtained. However, satisfactory yields may also be obtained by the use of other strong acids, for instance sulfuric acid and hydrochloric acid.

The alcohol is preferably a lower alkanol, for instance methanol, isopropanol, butanol or hexanol. Other alcohols, such as araliphatic alcohols (for instance benzyl alcohol) might be used.

The alcohol addition is illustrated by the following schemes of reaction, where E is an ethyl group:

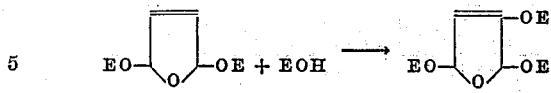

and

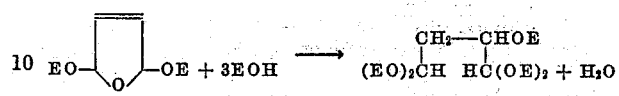

Thus the alcohol addition per se yields 2,3,5-triethoxytetrahydrofuran, whereas the addition and simultaneous alcoholysis results in the formation of ethoxysuccinic dialdehyde tetraethylacetal.

By hydrolysis of the compounds prepared in this manner, ethoxysuccinic dialdehyde is obtained according to the following schemes of reaction:

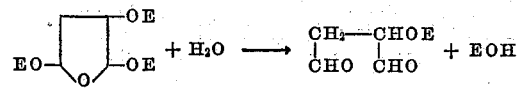

and

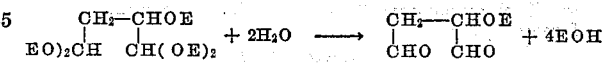

The 2,3,5-tri(lower alkoxy)tetrahydrofurans and their alcoholysates, being high-boiling liquids, are useful as organic solvents for high temperature reactions, such as Grignard reactions, wherein usual solvents such as tetrahydrofuran are unavailable because of their lower boiling-points. The 2,3,5-tri(lower alkoxy)tetrahydrofurans and their alcoholysates are also useful as intermediates in the preparation of the 6-lower alkoxy tropinones of this invention. Thus, 6-lower alkoxy tropines can be prepared by the hydrolysis of a mixture of tri(lower alkoxy)tetrahydrofuran and (lower alkoxy)succinic dialdehyde tetra (lower alkyl)acetal, and reaction of the resulting solution of (lower alkoxy)succinic dialdehyde with acetone dicarboxylic acid and methylamine to give a mixture of the cis and trans forms of racemic 6-lower alkoxy tropinones with different boiling points.

The following schemes of reaction will serve to illustrate this aspect of the invention:

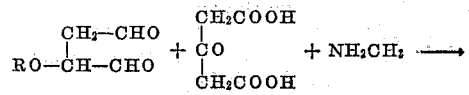

where R is a lower alkyl group including methyl, ethyl, propyl, etc.

The 6-lower alkoxy tropinones, thus formed, can then be cleaved to 6-hydroxytropinone by treating with aqueous hydrogen bromide in the known manner; or it can be converted to valeroidine by the known reactions of reduction of the 3-keto group to hydroxy, esterification of the resultant 6-lower alkoxy-3-hydroxytropinone with valeryl chloride, and cleaving of the 6-lower alkoxy group to yield valeroidine.

The invention is illustrated by the following examples:

EXAMPLE 1

150 g. of 2,5-diethoxy-2,5-dihydrofuran is dissolved in 560 cc. of anhydrous ethanol and 15 cc. of boron trifluoride etherate is added, whereafter the mixture is refluxed for 90 minutes at atmospheric pressure. A sodium ethoxide solution prepared from 7.5 g. of sodium and 60 cc. of ethanol is then added, and the reaction mixture is refluxed for a further 30 minutes. After cooling to room temperature the sodium borofluoride is filtered off and washed with 40 cc. of ether, which is added to the filtrate. The latter is then evaporated in vacuum from a water bath at 70° C. After removal of the alcohol in this manner, a surplus of sodium ethoxide precipitates as a gel which is removed by centrifugation and the reaction product is then distilled in vacuum. The yield is about 167 g. and the boiling point at 17 mm. is approximately 101–135° C.

By fractional distillation in vacuum the reaction product is divided into two fractions, one of which, amounting to 100 cc. boils at about 112–113° C. at 21 mm. pressure of mercury and consists of a mixture of stereoisomeric 2,3,5-triethoxytetrahydrofurans, and the other with a boiling point of about 146° C. at 21 mm. pressure of mercury, amounting to about 35 cc. consists of ethoxysuccinic dialdehyde tetraethylacetal.

EXAMPLE 2

13 g. of 2,5-dimethoxy-2,5-dihydrofuran is dissolved in 13 cc. of methanol. 0.2 cc. of acetyl chloride is added and the mixture is refluxed for 10 minutes. A solution of sodium methoxide, prepared from 0.065 g. of sodium and 5 cc. of methanol is added. The mixture is distilled in vacuum yielding about 14.2 g. of a mixture of acetals boiling at approximately 74–108° C. at 13 mm. pressure of mercury.

EXAMPLE 3

20 g. of 2,5-dimethoxy-2,5-dihydrofuran, 75 cc. of methanol and 2 cc. of boron trifluoride etherate are refluxed for 30 minutes, and the reaction mixture is worked up as described in Example 2. Yield about 25.9 g., boiling point approximately 60–112° C. at 14 mm. pressure of mercury.

EXAMPLE 4

Synthesis of 6-ethoxytropinone 5.0 g. of a mixture of 2,3,5-triethoxytetrahydrofuran and ethoxysuccinic dialdehyde tetraethylacetal, B.P. 94–134° C. (13 mm. Hg pressure) [prepared by the procedure of Example 1] are heated under reflux with 5 ml. of 0.1 normal hydrochloric acid and 25 ml. of water for about ten minutes and the resulting solution brought to pH 5 with 1 normal sodium bicarbonate solution after cooling to room temperature. Then 13.0 g. of acetone dicarboxylic acid dissolved in 50 ml. of water and brought to the same pH with 1 normal sodium hydroxide (about 150–200 ml.) is added to a buffer solution prepared from 20.9 g. of citric acid and 204 ml. of 1 normal sodium hydroxide. Finally, 1.9 g. of methylamine hydrochloride dissolved in a small amount of water is added and the resulting mixture left standing at room temperature overnight. 250 g. of anhydrous potassium carbonate (or 85 g. of anhydrous sodium carbonate) is then added in small portions with cooling and stirring and the mixture is continuously extracted with ether for 24 hours. The ethereal extract is dried with sodium sulfate, the ether evaporated and to the oily residue containing 6-ethoxytropinone is added a hot solution of 2.5 g. of picric acid in 100 ml. of ethanol. After cooling, 4.86 g. of yellow prisms of picrate A, M.P. about 157–159° C., separates. After three crystallizations from ethanol the M.P. is about 160–161° C. and the yield approximately 3.75 g.

After concentration of the mother liquor, 0.35 g. of a stereoisomer (picrate B) with a melting point of about 130–133° C. is obtained. After four crystallizations the M.P. is about 140–141° C.; mixed M.P. with picrate A is about 130° C.

*Cleavage of picrate A.*—18 g. of picrate A is suspended in 80 ml. of water and 40 g. of potassium carbonate is added in portions with stirring and cooling. The free base is isolated in the usual way. The yield is 6.3 g., B.P. about 120–121° C. (9 mm. Hg pressure); $n_D^{25}$ 1.482.

*Cleavage of picrate B.*—This cleavage is carried out in the same way as the cleavage of picrate A. The free base boils under 11 mm. pressure of mercury at about 135–136° C.; $n_D^{25}$ 1.484.

*Resolution of base A.*—60 g. of the racemic base A as obtained above is resolved in the customary way with the aid of d-tartaric acid. About 7.2 g. of the laevo base, B.P. about 129–130° C. (14 mm. Hg pressure), $n_D^{25}$ 1.482, $[\alpha]_D^{23}$ —19° (c.=1.01 in 96% ethanol), and about 13.2 g. of dextro base A, B.P. about 133–134° C. (16 mm. Hg pressure), $[\alpha]_D^{23}$ +17° (c.=1.02 in 96% ethanol), are obtained.

In a like manner 6-methoxytropinone can be prepared as hereinbefore described by hydrolyzing 2,3,5-trimethoxytetrahydrofuran and methoxysuccinic dialdehyde tetramethylacetal. The 6-propoxy derivative can be prepared in a similar manner.

The invention may be variously otherwise embodied within the scope of the appended claims.

I claim:

1. A method for the production of trialkoxytetrahydrofurans and their alcoholysates comprising heating a 2,5-di(lower alkoxy)-2,5-dihydrofuran with a lower alkanol in the presence of a strong acid, subsequently neutralizing the acid, and fractionally distilling the reaction product.

2. The method of claim 1, in which the acid is boron trifluoride.

3. The method of claim 2, in which the alkanol is methanol.

4. The method of claim 2, in which the alcohol is ethanol.

5. The method of claim 1, in which the acid is hydrochloric acid.

6. A method for the production of trialkoxytetrahydrofurans and their alcoholysates comprising heating a 2,5-di(lower alkoxy)-2,5-dihydrofuran with a lower alkanol in the presence of a strong acid, adding an alkali lower alkoxide to the reaction mixture and fractionally distilling the resulting mixture.

References Cited in the file of this patent
UNITED STATES PATENTS

| | | |
|---|---|---|
| 2,465,988 | Jones | Apr. 5, 1949 |
| 2,502,433 | Copenhaver | Apr. 4, 1950 |
| 2,746,976 | Stoll et al. | May 22, 1956 |

FOREIGN PATENTS

| | | |
|---|---|---|
| 78,714 | Denmark | Jan. 10, 1955 |

OTHER REFERENCES

Beilstein, vol. 1, p. 896, second suppl. (1941).
Stoll et al.: Chem. Abs., vol. 48, pp. 12138–39 (1954).
Stoll et al.: Helv. Chim. Acta., 35, p. 1265 (published June 16, 1952—received April 19, 1952).